(12) United States Patent
Tashev et al.

(10) Patent No.: US 8,090,532 B2
(45) Date of Patent: Jan. 3, 2012

(54) PEDESTRIAN ROUTE PRODUCTION

(75) Inventors: Ivan J. Tashev, Kirkland, WA (US);
Jeffrey D. Couckuyt, Bothell, WA (US);
Neil W. Black, Seattle, WA (US); John C. Krumm, Redmond, WA (US);
Ruston Panabaker, Redmond, WA (US); Michael Lewis Seltzer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 11/957,210

(22) Filed: Dec. 14, 2007

(65) Prior Publication Data

US 2009/0157302 A1    Jun. 18, 2009

(51) Int. Cl.
*G01C 21/00* (2006.01)

(52) U.S. Cl. ........ 701/206; 701/200; 701/201; 701/208; 701/211; 701/213; 340/991; 340/993; 340/990

(58) Field of Classification Search ................. 701/200, 701/201, 208, 211, 213; 340/991, 993, 990, 340/995; 364/443, 444, 449
See application file for complete search history.

(56) References Cited

U.S. PATENT DOCUMENTS

| | | |
|---|---|---|
| 4,884,208 A | 11/1989 | Marinelli et al. |
| 4,939,663 A | 7/1990 | Baird |
| 5,187,667 A | 2/1993 | Short |
| 5,422,813 A | 6/1995 | Schuchman et al. |
| 5,504,482 A | 4/1996 | Schreder |
| 5,629,854 A | 5/1997 | Schulte |
| 5,648,768 A | 7/1997 | Bouve |
| 5,774,073 A | 6/1998 | Maekawa et al. |
| 5,802,492 A * | 9/1998 | DeLorme et al. .......... 455/456.5 |
| 5,938,720 A | 8/1999 | Tamai |
| 5,987,381 A | 11/1999 | Oshizawa |
| 6,060,989 A | 5/2000 | Gehlot |
| 6,119,065 A | 9/2000 | Shimada et al. |
| 6,199,009 B1 | 3/2001 | Meis et al. |
| 6,199,045 B1 | 3/2001 | Giniger |
| 6,249,742 B1 | 6/2001 | Friederich et al. |
| 6,253,980 B1 | 7/2001 | Murakami et al. |
| 6,317,686 B1 | 11/2001 | Ran |
| 6,321,158 B1 | 11/2001 | DeLorme et al. |
| 6,339,746 B1 | 1/2002 | Sugiyama et al. |

(Continued)

FOREIGN PATENT DOCUMENTS

EP    1519288 A1    3/2005

(Continued)

OTHER PUBLICATIONS

Mapquest Business Solutions Advantage APITM http://cdn.mapquest.com/corpb2b/bsolutions-advantageapi-pdf-whitepaper.pdf. Last accessed Oct. 4, 2007, 22 pages.

(Continued)

*Primary Examiner* — Jack Keith
*Assistant Examiner* — Adam Tissot
(74) *Attorney, Agent, or Firm* — Shook, Hardy & Bacon L.L.P.

(57) ABSTRACT

As a pedestrian travels, various difficulties can be encountered, such as traveling through an unsafe neighborhood or being in an open area that is subject to harsh temperatures. A route can be developed for a person taking into account factors that specifically affect a pedestrian. Moreover, the route can alter as a situation of a user changes; for instance, if a user wants to add a stop along a route.

15 Claims, 10 Drawing Sheets

U.S. PATENT DOCUMENTS

| | | |
|---|---|---|
| 6,374,182 B2 | 4/2002 | Bechtolsheim et al. |
| 6,381,535 B1 | 4/2002 | Durocher et al. |
| 6,381,538 B1 | 4/2002 | Robinson et al. |
| 6,415,226 B1 | 7/2002 | Kozak |
| 6,470,267 B1 | 10/2002 | Nozaki |
| 6,510,379 B1 | 1/2003 | Hasegawa et al. |
| 6,526,350 B2 | 2/2003 | Sekiyama |
| 6,542,811 B2 | 4/2003 | Doi |
| 6,553,313 B1 | 4/2003 | Froeberg |
| 6,567,743 B1 | 5/2003 | Mueller et al. |
| 6,571,216 B1 | 5/2003 | Garg et al. |
| 6,622,087 B2 | 9/2003 | Anderson |
| 6,636,145 B1 | 10/2003 | Murakami et al. |
| 6,640,187 B1 | 10/2003 | Chenault et al. |
| 6,687,608 B2 | 2/2004 | Sugimoto et al. |
| 6,697,730 B2 | 2/2004 | Dickerson |
| 6,711,474 B1 | 3/2004 | Treyz et al. |
| 6,721,654 B2 | 4/2004 | Akiyama |
| 6,778,903 B2 | 8/2004 | Robinson et al. |
| 6,785,607 B2 | 8/2004 | Watanabe et al. |
| 6,813,501 B2 | 11/2004 | Kinnunen et al. |
| 6,826,472 B1 | 11/2004 | Kamei et al. |
| 6,829,532 B2 | 12/2004 | Obradovich et al. |
| 6,847,889 B2 | 1/2005 | Park et al. |
| 6,865,482 B2 | 3/2005 | Hull |
| 6,871,137 B2 | 3/2005 | Scaer et al. |
| 6,898,517 B1 | 5/2005 | Froeberg |
| 6,952,559 B2 | 10/2005 | Bates et al. |
| 6,965,325 B2 | 11/2005 | Finnern |
| 6,993,326 B2 | 1/2006 | Link, II et al. |
| 7,016,307 B2 | 3/2006 | Vasudev et al. |
| 7,027,915 B2 | 4/2006 | Craine |
| 7,043,356 B2 | 5/2006 | Linn |
| 7,058,506 B2 * | 6/2006 | Kawase et al. ............... 701/201 |
| 7,062,376 B2 | 6/2006 | Oesterling |
| 7,069,308 B2 | 6/2006 | Abrams |
| 7,076,409 B2 | 7/2006 | Agrawala et al. |
| 7,080,139 B1 | 7/2006 | Briggs et al. |
| 7,092,819 B2 | 8/2006 | Odachi et al. |
| 7,103,368 B2 | 9/2006 | Teshima |
| 7,149,625 B2 | 12/2006 | Mathews et al. |
| 7,196,639 B2 | 3/2007 | Joyce et al. |
| 7,212,919 B2 | 5/2007 | Chou et al |
| 7,221,928 B2 | 5/2007 | Laird et al. |
| 7,233,860 B2 | 6/2007 | Lokshin et al. |
| 7,233,861 B2 * | 6/2007 | Van Buer et al. ............ 701/209 |
| 7,239,960 B2 | 7/2007 | Yokota |
| 7,245,925 B2 | 7/2007 | Zellner |
| 7,250,907 B2 | 7/2007 | Krumm et al. |
| 7,286,837 B2 | 10/2007 | Giniger et al. |
| 7,295,805 B2 | 11/2007 | Walker |
| 7,308,236 B2 | 12/2007 | Fukushima |
| 7,376,414 B2 | 5/2008 | Engstrom |
| 7,403,905 B2 | 7/2008 | Shioda et al. |
| 7,466,986 B2 | 12/2008 | Halcrow et al. |
| 7,496,484 B2 * | 2/2009 | Agrawala et al. ............... 703/2 |
| 7,512,487 B1 | 3/2009 | Golding |
| 7,522,995 B2 | 4/2009 | Nortrup |
| 7,587,273 B2 * | 9/2009 | Ohnishi et al. ............... 701/202 |
| 7,624,024 B2 | 11/2009 | Levis et al. |
| 7,627,414 B2 | 12/2009 | Goto et al. |
| 2001/0014849 A1 | 8/2001 | King et al. |
| 2001/0020211 A1 | 9/2001 | Takayama et al. |
| 2001/0025222 A1 | 9/2001 | Bechtolsheim et al. |
| 2001/0032121 A1 | 10/2001 | Le |
| 2001/0037271 A1 | 11/2001 | Kubota |
| 2001/0044321 A1 | 11/2001 | Ausems et al. |
| 2001/0044693 A1 | 11/2001 | Gotou et al. |
| 2002/0004700 A1 | 1/2002 | Klein |
| 2002/0032035 A1 | 3/2002 | Teshima |
| 2002/0055872 A1 | 5/2002 | LaBrie |
| 2002/0084917 A1 | 7/2002 | Hauptman |
| 2002/0091568 A1 | 7/2002 | Kraft et al. |
| 2002/0097193 A1 | 7/2002 | Powers |
| 2002/0107027 A1 | 8/2002 | O'Neil |
| 2002/0121981 A1 | 9/2002 | Munch |
| 2002/0124050 A1 | 9/2002 | Middeljans |
| 2002/0169540 A1 | 11/2002 | Engstrom |
| 2002/0184091 A1 | 12/2002 | Pudar |
| 2003/0023371 A1 | 1/2003 | Stephens |
| 2003/0043045 A1 | 3/2003 | Yasushi |
| 2003/0093216 A1 | 5/2003 | Akiyama |
| 2003/0135304 A1 | 7/2003 | Sroub et al. |
| 2003/0158650 A1 | 8/2003 | Abe et al. |
| 2003/0182183 A1 | 9/2003 | Pribe |
| 2004/0076279 A1 | 4/2004 | Taschereau |
| 2004/0088392 A1 | 5/2004 | Barrett et al. |
| 2004/0117195 A1 | 6/2004 | Bodin |
| 2004/0117246 A1 | 6/2004 | Applebaum |
| 2004/0143496 A1 | 7/2004 | Saenz |
| 2004/0158433 A1 | 8/2004 | Wimschneider et al. |
| 2004/0204848 A1 | 10/2004 | Matsuo et al. |
| 2004/0233045 A1 | 11/2004 | Mays |
| 2005/0085997 A1 | 4/2005 | Park |
| 2005/0125148 A1 * | 6/2005 | Van Buer et al. ............ 701/209 |
| 2005/0132024 A1 | 6/2005 | Habaguchi et al. |
| 2005/0140524 A1 | 6/2005 | Kato et al. |
| 2005/0165762 A1 | 7/2005 | Bishop |
| 2005/0197764 A1 | 9/2005 | Wolf |
| 2005/0198287 A1 | 9/2005 | Sauve et al. |
| 2005/0216182 A1 | 9/2005 | Hussain et al. |
| 2005/0267651 A1 | 12/2005 | Arango |
| 2006/0041500 A1 | 2/2006 | Diana et al. |
| 2006/0058947 A1 | 3/2006 | Schalk |
| 2006/0074531 A1 | 4/2006 | Saarinen et al. |
| 2006/0095374 A1 | 5/2006 | Lo |
| 2006/0123053 A1 | 6/2006 | Scannell |
| 2006/0129313 A1 | 6/2006 | Becker et al. |
| 2006/0143183 A1 | 6/2006 | Goldberg et al. |
| 2006/0190168 A1 | 8/2006 | Ohnishi et al. |
| 2006/0218225 A1 | 9/2006 | Hee Voon et al. |
| 2006/0235739 A1 | 10/2006 | Levis et al. |
| 2006/0241859 A1 | 10/2006 | Kimchi et al. |
| 2006/0241862 A1 | 10/2006 | Ichihara et al. |
| 2006/0247852 A1 | 11/2006 | Kortge |
| 2006/0265119 A1 | 11/2006 | McMahan et al. |
| 2006/0270421 A1 | 11/2006 | Phillips et al. |
| 2006/0291396 A1 | 12/2006 | Hamilton et al. |
| 2007/0005233 A1 | 1/2007 | Pinkus et al. |
| 2007/0016362 A1 | 1/2007 | Nelson |
| 2007/0027593 A1 | 2/2007 | Shah et al. |
| 2007/0032947 A1 | 2/2007 | Yamada et al. |
| 2007/0050240 A1 | 3/2007 | Belani et al. |
| 2007/0050248 A1 | 3/2007 | Huang et al. |
| 2007/0050279 A1 | 3/2007 | Huang et al. |
| 2007/0061057 A1 * | 3/2007 | Huang et al. ................... 701/23 |
| 2007/0061838 A1 | 3/2007 | Grubbs et al. |
| 2007/0073480 A1 | 3/2007 | Singh |
| 2007/0073841 A1 | 3/2007 | Ryan et al. |
| 2007/0078729 A1 | 4/2007 | Brown |
| 2007/0093258 A1 | 4/2007 | Steenstra et al. |
| 2007/0100805 A1 | 5/2007 | Ramer et al. |
| 2007/0106465 A1 | 5/2007 | Adam et al. |
| 2007/0106468 A1 | 5/2007 | Eichenbaum et al. |
| 2007/0128900 A1 | 6/2007 | Bauman |
| 2007/0129082 A1 | 6/2007 | Thacher |
| 2007/0146200 A1 | 6/2007 | Norin et al. |
| 2007/0156326 A1 | 7/2007 | Nesbitt |
| 2007/0176796 A1 | 8/2007 | Bliss et al. |
| 2007/0203644 A1 | 8/2007 | Thota et al. |
| 2007/0208495 A1 | 9/2007 | Chapman et al. |
| 2007/0210937 A1 | 9/2007 | Smith et al. |
| 2007/0218900 A1 | 9/2007 | Abhyanker |
| 2007/0219717 A1 | 9/2007 | Chang |
| 2007/0244627 A1 | 10/2007 | Boss et al. |
| 2007/0250259 A1 | 10/2007 | Dare |
| 2007/0257792 A1 | 11/2007 | Gold |
| 2007/0293958 A1 | 12/2007 | Stehle et al. |
| 2008/0033644 A1 | 2/2008 | Bannon |
| 2008/0046134 A1 | 2/2008 | Bruce et al. |
| 2008/0046165 A1 | 2/2008 | Downs et al. |
| 2008/0200312 A1 | 8/2008 | Tagliabue |
| 2008/0293430 A1 | 11/2008 | Blom et al. |
| 2008/0312819 A1 | 12/2008 | Banerjee |
| 2009/0005973 A1 | 1/2009 | Salo |

| | | | |
|---|---|---|---|
| 2009/0012703 | A1 | 1/2009 | Aso et al. |
| 2009/0048771 | A1 | 2/2009 | Speier et al. |
| 2010/0036610 | A1 | 2/2010 | Urciuoli et al. |

FOREIGN PATENT DOCUMENTS

| | | |
|---|---|---|
| EP | 1659368 A1 | 5/2006 |
| JP | 2002156234 A | 5/2002 |
| KR | 102006001683 A | 2/2006 |
| WO | WO0002389 A1 | 1/2000 |
| WO | WO0108413 A1 | 2/2001 |
| WO | WO0239367 A1 | 5/2002 |
| WO | 2003019478 A1 | 3/2003 |
| WO | 03042950 A1 | 5/2003 |
| WO | WO03063521 A2 | 7/2003 |
| WO | W02004084437 A1 | 9/2004 |
| WO | 2007131225 A2 | 11/2007 |

OTHER PUBLICATIONS

Route Guidance 'That Won't Replace One Jam with Another', m.logistics, Man/Jun. 2005, Issue 17. http://www.mlogmag.com/magazine/17/route-guidance.shtml. Last accessed Oct. 4, 2007, 3 pages.

New Magellan (Thales) MAESTRO4000 Vehicle Navigation System http://cgi.ebay.com/NEW-MAESTR04000-Vehicle-Navigation-System-980919-01_W0QQitem-Z110163915037QQihZ001QQcategoryZ73332QQcmdZViewItem. Last accessed Oct. 4, 2007, 5 pages.

Moshe Ben-Akiva, et al. Development of a Route Guidance Generation System for Real-Time Application http://rosowww.epfl.ch/mbi/papers/chania.pdf. Last accessed Apr. 10, 2007, 6 pages.

W. -T. Balke, et al. A Situation-aware Mobile Traffic Information System http://www.I3s.de/~balke/paper/hicss03.pdf. Last accessed Apr. 10, 2007, 10 pages.

Keri Schreiner. Where We At? Mobile Phones Bring GPS to the Masses, May/Jun. 2007, Published by the IEEE Computer Society, 0272-1716/07 http://www.computer.org/portal/cms_docs_cga/cga/content/Promo/g3006_07.pdf. Last accessed Oct. 4, 2007, 6 pages.

Alan Mislove, et al. Exploiting Social Networks for Internet Search http://www.mpi-sws.mpg.de/~amislove/publications/PeerSpective-HotNets.pdf. Last accessed Oct. 3, 2007, 6 pages.

Sergi Marti, et al. DHT Routing Using Social Links. http://iptps04.cs.ucsd.edu/papers/marti-social.pdf. Last accessed Oct. 3, 2007, 6 pages.

Antonio Kruger, et al. The Connected User Interface: Realizing a Personal Situated Navigation Service. IUI'04, Jan. 13-16, 2004, Madeira, Funchal, Portugal. ACM 1-58113-815-6/04/0001 www.medien.ifi.Imu.de/pubdb/publications/pub/butz2004userinterface/butz2004userinterface.pdf. Last accessed Oct. 3, 2007, 8 pages.

Managing Demand Through Travel Information Services, U.S. Department of Transportation, Federal Highway Administration http://ops.fhwa.dot.gov/publications/manag_demand_tis/travelinfo.htm. Last accessed Oct. 3, 2007, 33 pages.

Boualem Benatallah, et al. Ocean—Scalable and Adaptive Infrastructure for On-board Information Access, UNSW-CSE-TR-0601, Jan. 2006. http://www.cse.unsw.edu.au/~llibman/papers/unsw601.pdf. Last accessed Oct. 3, 2007, 14 pages.

N. Hristova, et al. Ad-Me: A Context-Sensitive Advertising System http://www.cs.ucd.ie/csprism/publications/Ericsson-UCD/HriAdme01ii.pdf. Last accessed Oct. 3, 2007, 10 pages.

Alessandra Agostini, et al. Integrated Profile Management for Mobile Computing http://webmind.dico.unimi.it/papers/AI2IA.pdf. Last accessed Oct. 3, 2007, 5 pages.

MPOS AdSpace http://www.xiam.com/xiam.products.adspace.shtml. Last accessed Oct. 5, 2007, 1 page.

Design and Implementation of Location-Based Wireless Targeted Advertising, Proc. SPIE vol. 4586, p. 291-297, Wireless and Mobile Communications. http://adsabs.harvard.edu/abs/2001SPIE.4586..291L. Last accessed Oct. 5, 2007, 2 pages.

Toshihiro Osaragi, et al. Map Element Extraction Model for Pedestrian Route Guidance Map http://ieeexplore.ieee.org/xpl/freeabs_all.jsp?arnumber=1532626. Last accessed Oct. 3, 2007, 10 pages.

S. P. Hoogendoorn, et al. Pedestrian Route-Choice and Activity Scheduling Theory and Models, Transportation Research Part B 38 (2004) 169-190, doi:10.1016/S0191-2615(03)00007-9, Elsevier Ltd. The Netherlands. http://www.pedestrians.tudelft.nl/publications/TR%20B%2004%20rc.pdf. Last accessed Oct. 3, 2007, 22 pages.

Alexandra Millonig, et al. Developing Landmark-Based Pedestrian Navigation Systems, Digital Object Identifier 10.1109/TITS.2006.889439, 1524-9050, IEEE Transactions on Intelligent Transportation Systems, vol. 8, No. 1, Mar. 2007. http://ieeexplore.ieee.org/xpl/freeabs_all.jsp?arnumber=1520046. Last accessed Oct. 3, 2007, 7 pages.

Srihari Narsimhan, et al. Methods for Optimal Pedestrian Task Scheduling and Routing http://www.cs.nott.ac.uk/~rxq/PlanSIG/narasimhan.pdf. Last accessed Oct. 3, 2007, 8 pages.

Gunther Retscher, et al. NAVIO—A Navigation and Guidance Service for Pedestrians. Journal of Global Positioning Systems (2004), vol. 3, No. 1-2: 208-217 http://www.gmat.unsw.edu.au/wang/jgps/v3n12/v3n12p26.pdf. Last accessed Oct. 3, 2007, 10 pages.

About Amaze, 2000-2007 LocatioNet Systems Ltd http://www.amazegps.com/docs/amAze_UM_en%203.1.pdf. Last accessed Oct. 4, 2007, 37 pages.

Route 66 Mobile 7 for Nokia Series 60 Mobile Phones Launched in North America, Dec. 8, 2005, St. Louis, MO. http://www.66.com/route66/news.php?cid=US&sec=0&ssec=9&news=555. Last accessed Oct. 4, 2007, 2 pages.

Vijoy Pandey, et al. Exploiting User Profiles to Support Differentiated Services in Next-Generation Wireless Networks. Jul. 15, 2002 http://networks.cs.ucdavis.edu/~ghosal/Research/publications/vijoy-profiling-network-magazine.pdf. Last accessed Oct. 4, 2007, 23 pages.

Non-Final Office Action mailed Aug. 17, 2010 in U.S. Appl. No. 12/033,690.

Final Office Action mailed Feb. 1, 2011 in U.S. Appl. No. 12/033,690.

Non-Final Office Action mailed Aug. 17, 2010 in U.S. Appl. No. 12/033,652.

Non-Final Office Action mailed Nov. 1, 2010 in U.S. Appl. No. 11/957,182.

Final Office Action mailed Feb. 14, 2011 in U.S. Appl. No. 11/957,182.

Non-Final Office Action mailed Nov. 19, 2010 in U.S. Appl. No. 11/957,206.

International Search Report with Written Opinion dated Aug. 24, 2009 for PCT/US2009/030380.

International Search Report with Written Opinion dated Aug. 24, 2009 for PCT/US2009/030377.

Franziska Klugl, et al. Route Decision Behaviour in a Commuting Scenario: Simple Heuristics Adaptation and Effect of Traffic Forecast. Journal of Artificial Societies and Social Simulation vol. 7, No. 1. Published: Jan. 31, 2004. http://jasss.soc.surrey.ac.ukl71111.html. Last accessed 12111107, 21 pages.

"Mohamed A. Abedel-Aty, et al. Impact of ATIS on Drivers' Decisions and Route Choice: A Literature Review, University of California, Davis. UCB-ITS-PRR-93-11, Sep. 1993, ISSN 10551425http://repositories.cdlib.org/cgi/viewcontenl.cgi?article=1254&context=its/path. Last accessed Dec. 7, 2007, 48 pages."

"Lisa J. Molnar, et al. Developing Information Systems for the Driving Tourist: A Literature Review, Feb. 1996. http://66.1 02.1.1 04/scholar?hl=en&lr=&q=cache:GJzx9CvxhCQJ:sambuca.umdl.umich.edu:80801/handle/2027.42/1160. Last accessed Dec. 11, 2007, 81 pages."

"Martin O'Hara. Automated Congestion Charge Payment Scheme Using Smartnav Intelligent Satellite Navigation System, Apr. 13, 2005. Last accessed Dec. 11, 2007, 7 pages.http://www.tridatacom.co. ukiDownloads/papers/Papers/RI N%20Congestion%20 130405 .pdf."

"James Baring. The Solution to the Traffic Congestion Problem, Dec. 1, 2006.http://revelstoke.org.uklgsmpccs.htm. Last accessed 12/11107, 5 pages."

"Atlanta Unveils Traffic Reduction Plan, posted Aug. 28, 2007.http://www.environmentaldefense.org/article .cfm? contentl 0=6812. Last accessed Dec. 11, 2007, 1 page."

"Goncalo Correia, et al. Car Pooling Clubs: Solution for the Affiliation Problem in Traditional/Dynamic Ridesharing Systemshttp://www.iasi.cnr.itlewgtl16conference/ID92.pdf. 6 pages."

"Pilot Tests of Dynamic Ridesharing, updated Jan. 23, 2007.http://www.ridenow.org/ridenow_ summary.html. Last accessed Dec. 11, 2007, 35 pages."

"iCarpoolhttp://www.icarpool.com/enITransportationPlanner.htm. Last accessed Dec. 11, 2007, 2 pages."

"Ecolane Dynamic CarpoolTM, Ecolane Finland Oy 2006.http://www.ecolane.com/services/carpool/index.html. Last accessed 12/11107, 1 page."

"Route Planner, vol. 3 -Modules, (Route Planner—Sep. 6, 2002—LA-UR-00/1767—TRANSIMS 3.0).http://ndssl.vbi.v1.edu/PublicationslTransimsVol3Ch4.pdf. Last accessed 12/11107,60 pages."

"Meredith Williams. Reduce Stress and Stay Organized While Running Errandshttp://www.microsoff.com/athome/intouch/directions.mspx. Last accessed 12/11107, 3 pages."

"TomTom Itinerary Planninghttp://www.gpsreview.netItomtom-itinerary-planning/. Last accessed Dec. 11, 2007, 12 pages."

Final Office Action mailed Mar. 18, 2011 in U.S. Appl. No. 12/033,652.

Non-Final Office Action mailed Mar. 8, 2011 in U.S. Appl. No. 11/957,115.

Non-Final Office Action mailed Mar. 25, 2011 in U.S. Appl. No. 11/957,219.

Non-Final Office Action mailed Mar. 29, 2011 in U.S. Appl. No. 12/033,627.

Non-Final Office Action mailed Mar. 30, 2011 in U.S. Appl. No. 11/957,188.

Non-Final Office Action mailed Mar. 30, 2011 in U.S. Appl. No. 11/957,167.

International Search Report with Written Opinion dated Jun. 29, 2009 (PCT/US2008/083543).

International Search Report with Written Opinion dated Jun. 22, 2009 (PCT/US2008/083538).

Broadhurst, et al., Monte Carlo Road Safety Reasoning, presented at the IEEE Intelligent Vehicle Symposium (IV2005), IEEE.

Final Office Action mailed Oct. 15, 2011 in U.S. Appl. No. 11/957,127.

Non-Final Office Action mailed Sep. 28, 2011 in U.S. Appl. No. 11/957,219.

Non-Final Office Action mailed Aug. 9, 2011 in U.S. Appl. No. 12/033,652.

Final Office Action mailed Sep. 14, 2011 in U.S. Appl. No. 12/033,627.

Non-Final Office Action mailed Aug. 23, 2011 in U.S. Appl. No. 11/957,206.

Non-Final Office Action mailed Oct. 6, 2011 in U.S. Appl. No. 11/957,151.

Notice of Allowance mailed Aug. 24, 2011 in U.S. Appl. No. 11/957,182.

Non-Final Office Action mailed Apr. 27, 2011 in U.S. Appl. No. 11/957,127.

Non-Final Office Action mailed Jun. 13, 2011 in U.S. Appl. No. 12/033,690.

Non-Final Office Action mailed May 27, 2011 in U.S. Appl. No. 11/957,139.

Final Office Action mailed Apr. 21, 2011 in U.S. Appl. No. 11/957,206.

Non-Final Office Action mailed Jul. 21, 2011 in U.S. Appl. No. 11/957,139.

* cited by examiner

… … …

PEDESTRIAN ROUTE PRODUCTION

CROSS-REFERENCE

This application relates to U.S. patent application Ser. No. 11/957,115 entitled "ROUTE MONETIZATION".

This application relates to U.S. patent application Ser. No. 11/957,127 entitled "FEDERATED ROUTE PRODUCTION".

This application relates to U.S. patent application Ser. No. 11/957,139 entitled "DESTINATION AUCTIONED THROUGH BUSINESS OF INTEREST".

This application relates to U.S. patent application Ser. No. 11/957,151 entitled "GENERATIONAL INTELLIGENT NAVIGATION SYNCHRONIZATION OR UPDATE".

This application relates to U.S. patent application Ser. No. 11/957,167 entitled "SOCIAL NETWORK BASED ROUTES".

This application relates to U.S. patent application Ser. No. 11/957,182 entitled "ROUTE TRANSFER BETWEEN DEVICES".

This application relates to U.S. patent application Ser. No. 11/957,188 entitled "ADDITIONAL CONTENT BASED ON INTENDED TRAVEL DESTINATION".

This application relates to U.S. patent application Ser. No. 11/957,206 entitled "AUTOMATIC SPLICES FOR TARGETED ADVERTISEMENTS".

This application relates to U.S. patent application Ser. No. 11/957,219 entitled "ROUTE GENERATION BASED UPON ACTIVITY CRITERIA".

TECHNICAL FIELD

The subject specification relates generally to route production and in particular to route generation for a pedestrian.

BACKGROUND

Computer-driven automobile route planning applications are utilized to aid users in locating points of interest, such as particular buildings, addresses, and the like. Additionally, in several existent commercial applications, users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a municipality, state/providence, and/or country, proximity of the point of interest to major freeways, proximity of the point of interest to a specific city, and the like.

Furthermore, conventional computer-implemented mapping applications often include automotive route-planning applications that can be utilized to provide users with directions between different locations. Pursuant to an example, a user can provide an automotive route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check box that enables a user to specify that she wishes to avoid highways. Similarly, a user can inform the route planning application that she wishes to travel on a shortest route or a route that takes a least amount of time (as determined by underlying algorithms). Over the last several years, individuals have grown to rely increasingly on route planning applications to aid them in everything from locating a friend's house to planning cross-country road trips.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventional route generation systems obtain data from various sources and generate a direction set to be used by a person operating an automobile. A user commonly inputs a starting location and an intended destination in addition to travel constraints (e.g., to avoid highways, minimum travel time, minimal travel distance, or minimal gas consumption); based upon inputted information, a travel route is generated. However, there are numerous difficulties in translating vehicle (e.g., automotive) route generation to pedestrian travel. For instance, a pedestrian can commonly traverse terrain that is more rugged then many vehicles (e.g., climbing steep and rocky hills); conversely, a pedestrian can become more susceptible to environmental influence, such as from cold temperatures.

The disclosed innovation produces routes that are intended to be taken by a pedestrian. A gather component obtains information related to intended pedestrian travel and a generation component produces a route based upon at least part of the obtained information. Commonly, the pedestrian route is produced based off security information, weather information, terrain information, or a combination thereof. Various features can integrate with route presentment, such as integrating an advertisement targeted to a pedestrian with a direction set.

A large amount of focus in route generation has focused upon vehicle route generation and little attention has been paid to pedestrian route production. Since a large number of individuals travel by vehicle, application to pedestrian travel has been ignored. However, there has been a long felt need for route generation towards individuals that do not commonly travel by vehicle—for instance, many economically challenged areas are populated with individuals that do not own motorized vehicles and generally travel by walking. In addition, unexpected results can take place through practice of the disclosed innovation. As an illustration, a pedestrian could arrive at a location faster than if she traveled in a vehicle by taking more direct paths, yet a vehicle commonly travels much faster. Due to detailed route planning, a direction set can be created that allows a user to take more diverse paths that can compensate for a general lack of speed.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
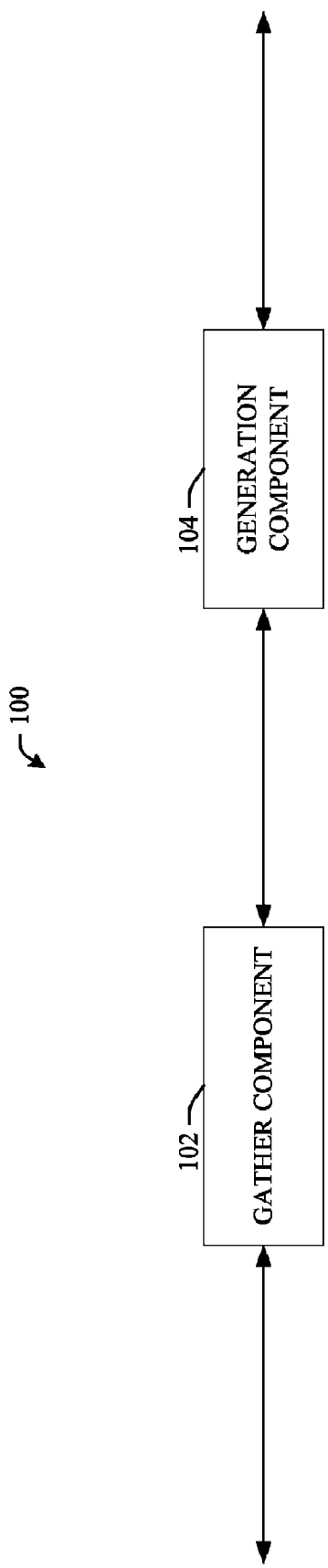
FIG. 1 illustrates a representative system for producing a pedestrian-based route in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that various determinations or inferences made in the subject specification can be practiced through use of artificial intelligence techniques.

Now referring to FIG. 1, an example system 100 is disclosed for producing a travel route for a pedestrian. Various route production systems are available for a user traveling though utilization of a vehicle. However, a pedestrian (e.g., a person traveling in a natural manner, such as walking, swimming, climbing, etc., an individual functioning as a passenger, a person riding along an escalator or elevator, controlling/riding in a wheelchair, and the like) can have specific characteristics that are different from what is considered in vehicle route planning. For example, when a user travels as a pedestrian, she is commonly more exposed environmental elements. If it is relatively cold outside, then a pedestrian is far more likely to feel an impact then if a vehicle equipped with a heating system protected her. Moreover, it can be more dangerous for a pedestrian to enter an unsafe neighborhood then a person in a vehicle since a pedestrian is more exposed and it is more difficult for her to leave an unsafe neighborhood quickly. However, there are advantages to being a pedestrian traveler; if a pedestrian takes an incorrect action (e.g., turns down a wrong street), then correction can be easier since there are commonly fewer one-way pedestrian streets.

The system 100 can produce a direction set that is specifically tailored to pedestrian travel. A gather component 102 can obtain information related to pedestrian travel. Example information related to pedestrian travel include maps (e.g., extracted from a database), user history, weather information, crime statistics, demographic information, etc. Various processing can take place upon the obtained information, such as ranking obtained information toward relevance in pedestrian route production.

Obtained information and metadata (e.g., ranking results) can transfer from the gather component 102 to a generation component 104 that produces a direction set for use by a pedestrian based at least part upon the obtained information. Obtained information can be analyzed and analysis results are used to create a new travel route or modify an existing travel route. The produced direction set can be outputted to a user device, such as a cellular telephone, personal digital assistant, watch, dedicated vehicle device, printer etc. The produced direction set can be improved or optimized according to at least one criterion, such as keeping a user safe.

The following is an illustrative example of operation of the system 100 according to an aspect of the subject specification. Historically, at 5 PM, a user can walk from his office to his home on weekdays; the gather component 102 can learn this history and obtain information related to the walk (e.g., paths previously taken by a user, available paths, user experiences upon the paths, etc.). For instance, the gather component 102 can extract information from a schedule that the user is to attend his daughter's recital in several hours, so it is likely he wants a quickest path. The generation component 104 can analyze the information and construct a direction set that allows the user to take paths that take him to his home in a quickest amount of time while keeping the user relatively safe (e.g., taking the user through neighborhoods with violent crime statistics below a certain threshold).

Figure 2:
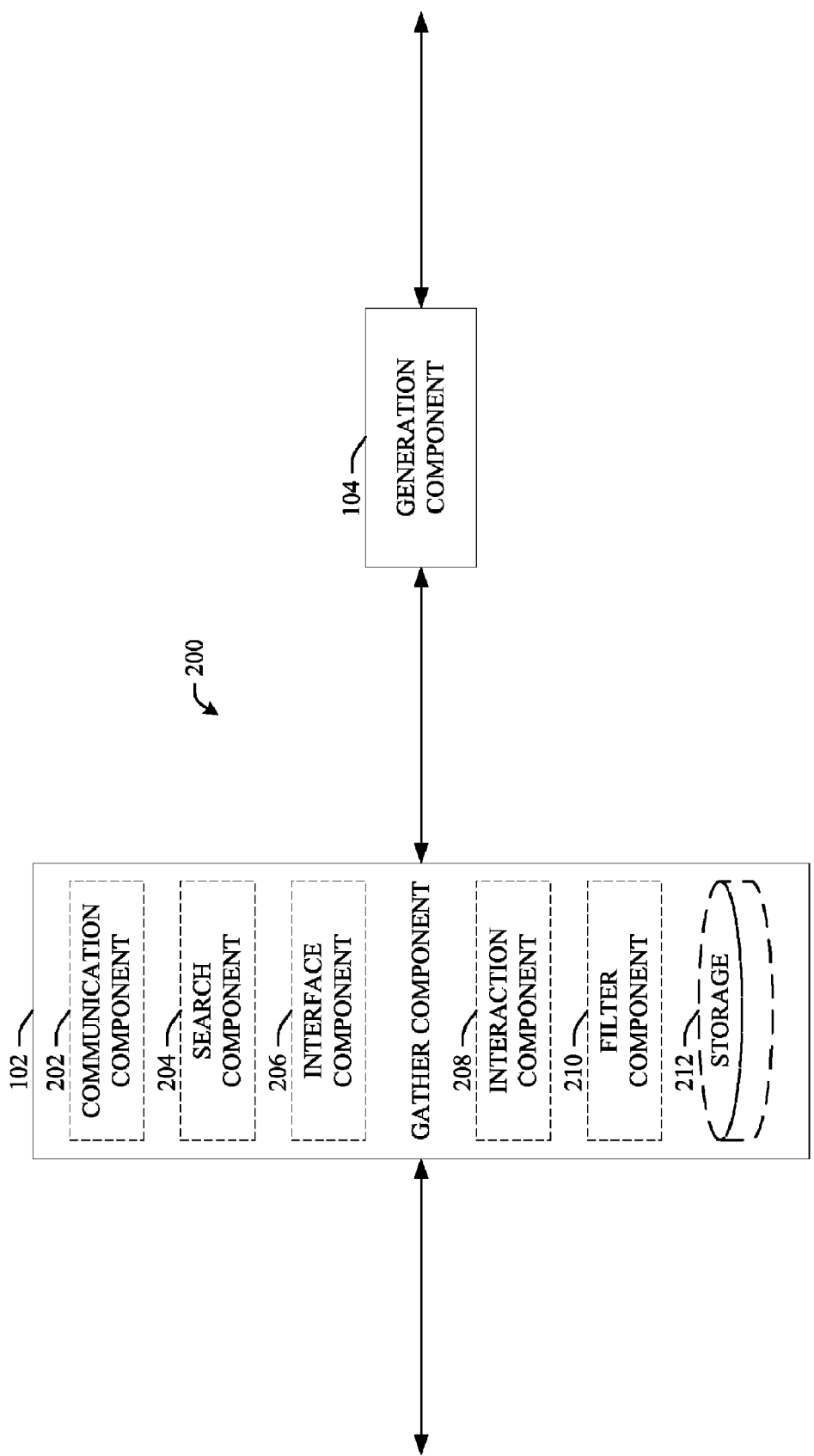
FIG. 2 illustrates a representative system for producing a pedestrian-based route with a detailed gather component in accordance with an aspect of the subject specification.

Now referring to FIG. 2, an example system 200 is disclosed for producing a pedestrian-based route with a representative detailed gather component 102. The gather component 102 collects information from various sources that can be used to create a pedestrian route. A communication component 202 can engage with other devices to transfer information, such as to send a request for information, receiving information from an auxiliary source, etc. Operation can take place wirelessly, in a hard-wired manner, employment of security technology (e.g., authentication and/or encryption), etc. Moreover, the communication component 202 can utilize various protective features, such as performing a virus scan on obtained data and blocking information that is positive for a virus.

To engage a source (e.g., auxiliary source), a search component 204 can be employed to locate a source that provides information that can be obtained. A source can be a database server, an airway transmission, in incoming electronic message, etc. The search component 204 can retain addresses (e.g., Internet Protocol addresses) of locations that have a history of providing quality information. Moreover, the search component 204 can identify low quality sources (e.g., sources that do not provide much information that is used in route generation) and block information obtainment for such identified sources. The search component 204 can function to extract information from a source, make a copy of information, etc. In addition, information from a plurality of pedestrians (e.g., pedestrian history) can be retained upon a server and extracted though use of the search component 204.

In addition to extracting information from auxiliary sources, an interface component 206 enables a user to input information that can be used in route production. Common data inputted by a user includes a starting location, constraints (e.g., not to travel over unpaved terrain), intended destination, and the like. The user can enter information in a number of different manners, such as through a keyboard, mouse, stylus, tablet computer, microphone, etc.

In one aspect, a pedestrian can have a desire to engage a particular person or group of people. For example, the system 200 can be on an electronic device of a small child that has become lost from her parents. An interaction component 208 can collect information concerning routes of other people and collected data can be used to update a route in real-time, such as for the child to meet with her parents. The interaction component 208 can be bidirectional, meaning it can collect route or location information of others (e.g., pedestrians, in vehicles, etc.) as well as transmit collected data or direction set information to others (e.g., global transmission, directed transmission, etc.). Based upon this routes can be produced upon multiple devices that lead to a common meeting point.

The gather component 102 can obtain virtually any type of information that relates to pedestrian travel—so much information that operation of the system 200 can lose performance due to tasks associated with processing the information. A filter component 210 can limit information that passes through to a generation component 104 that constructs a direction set. The filter component 210 can determine information that is likely relevant and delete information that is commonly of little value; this can be done at least in part through examination of previously produced routes.

Different pieces of information, such as obtained information, component operating instructions (e.g., of the search component 204), source location, an original route, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a Redundant Array of Independent Drives configuration).

Figure 3:
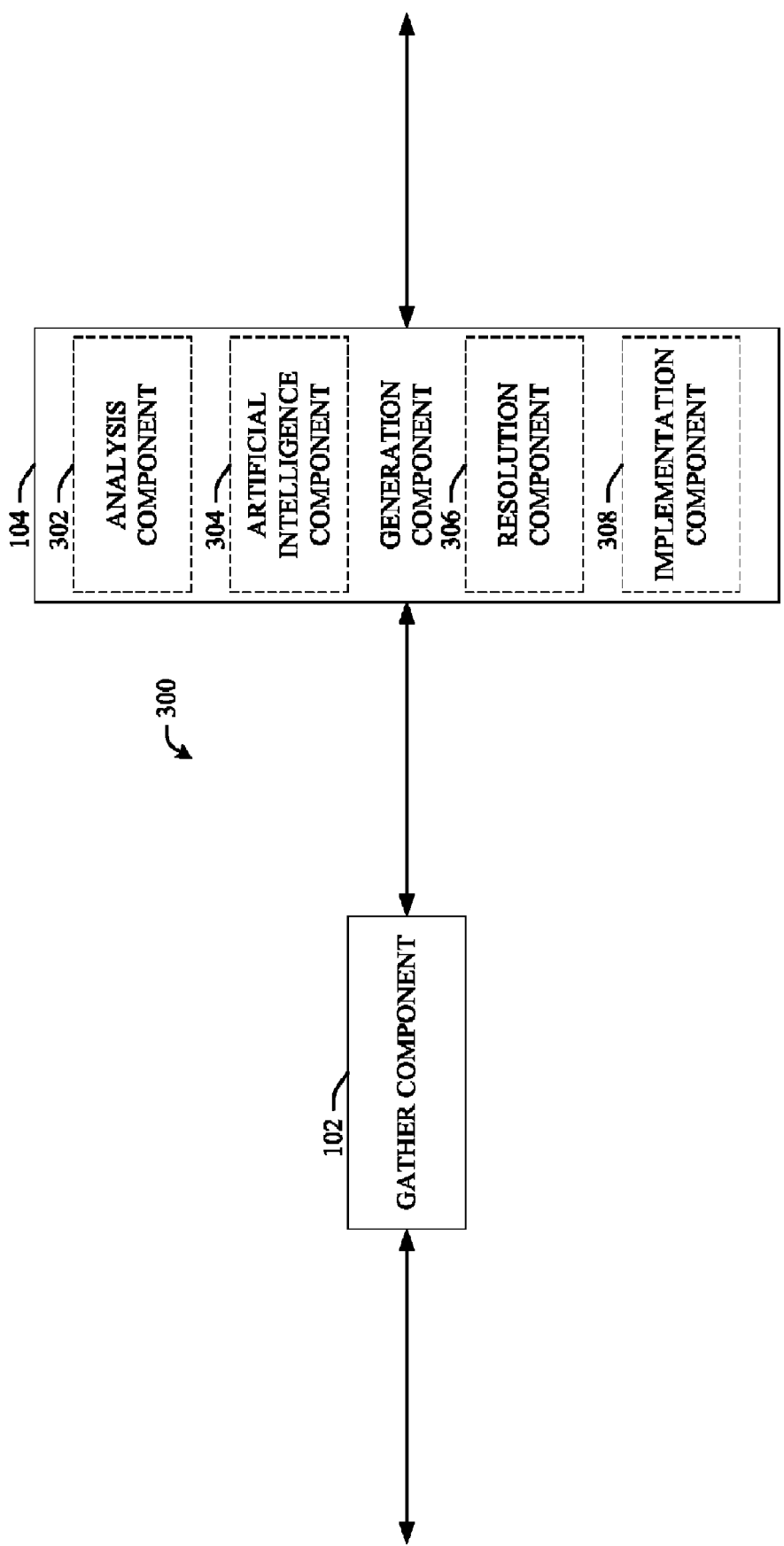
FIG. 3 illustrates a representative system for producing a pedestrian-based route with a detailed generation component in accordance with an aspect of the subject specification.

Now referring to FIG. 3, an example system 300 is disclosed for producing a pedestrian route with a detailed generation component 104. A gather component 102 can obtain information related to pedestrian travel; a generation component 104 can produce a direction set for use by a pedestrian based at least part upon the obtained information. A substantial portion of the directions set can take a user along a route that is not maneuverable by an automobile (e.g., sidewalks, indoor structures, rugged terrain, etc.). For instance, a direction set takes a user along sidewalks and occasionally the user crosses a street that can be traversed by an automobile.

Various characteristics of obtained information can be appreciated through evaluation of obtained information. An analysis component 302 evaluates the obtained information, the evaluation results are used by the generation component 104 to produce the direction set. Evaluating can include determining importance of information to a user (e.g., has a user historically cared about safe neighborhoods), estimating how likely information is to change (e.g., sidewalk congestion), etc. Additionally, the analysis component 302 can choose if a user should reach a destination through a pedestrian route and/or through a conventional route (e.g., a route intended to be traveled by an automobile where the user is a driver). For example, a user can be traveling to a downtown area to watch a baseball game where the user has an option to take public transportation or to drive to the game. The analysis component 302 can process different factors, such as cost of public transportation against cost of parking, and determine if a pedestrian route or other route should be produced.

An artificial intelligence component 304 can make at least one inference or at least one determination in relation to information obtainment or direction set production. For instance, the artificial intelligence component 304 can infer if a user will find a route enjoyable due to previous behavior (e.g., the user walked briskly, the user stopped presumably to view a scenic area or point of interest, etc.) and a route is produced based upon the inference. Moreover, the artificial intelligence component 304 can determine a format a pedestrian would like to receive a direction set. For example, a blind pedestrian can prefer to have a direction set verbally read or printed in Braille and the artificial intelligence component 304 can determine the preference.

Artificial intelligence component 304 can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

A resolution component 306 can be used to settle conflicts between different pieces of information where conflicting details are provided. For instance, a news channel can report that there is heavy pedestrian traffic along a sidewalk while a store can publish information that few people are passing the store and offer incentives for routes to direct a user past the store. Since the store has a financial interest in sidewalk traffic, store information can be considered less reliable and the resolution component 306 can instruct the generation component 104 to build a route based upon the news information. Decisions concerning direction set production can be placed into effect by an implementation component 308. Common implementations include building a new direction set, altering a direction set, and the like. Consistency checks can be run by the implementation component 308, such as if multiple goals of a user are met (e.g., a user wants to take a fastest route and stop to buy lunch; however, there is not a store selling food along a fastest route). If a check fails, then the generation component 104 can modify the route before it is produced.

Figure 4:
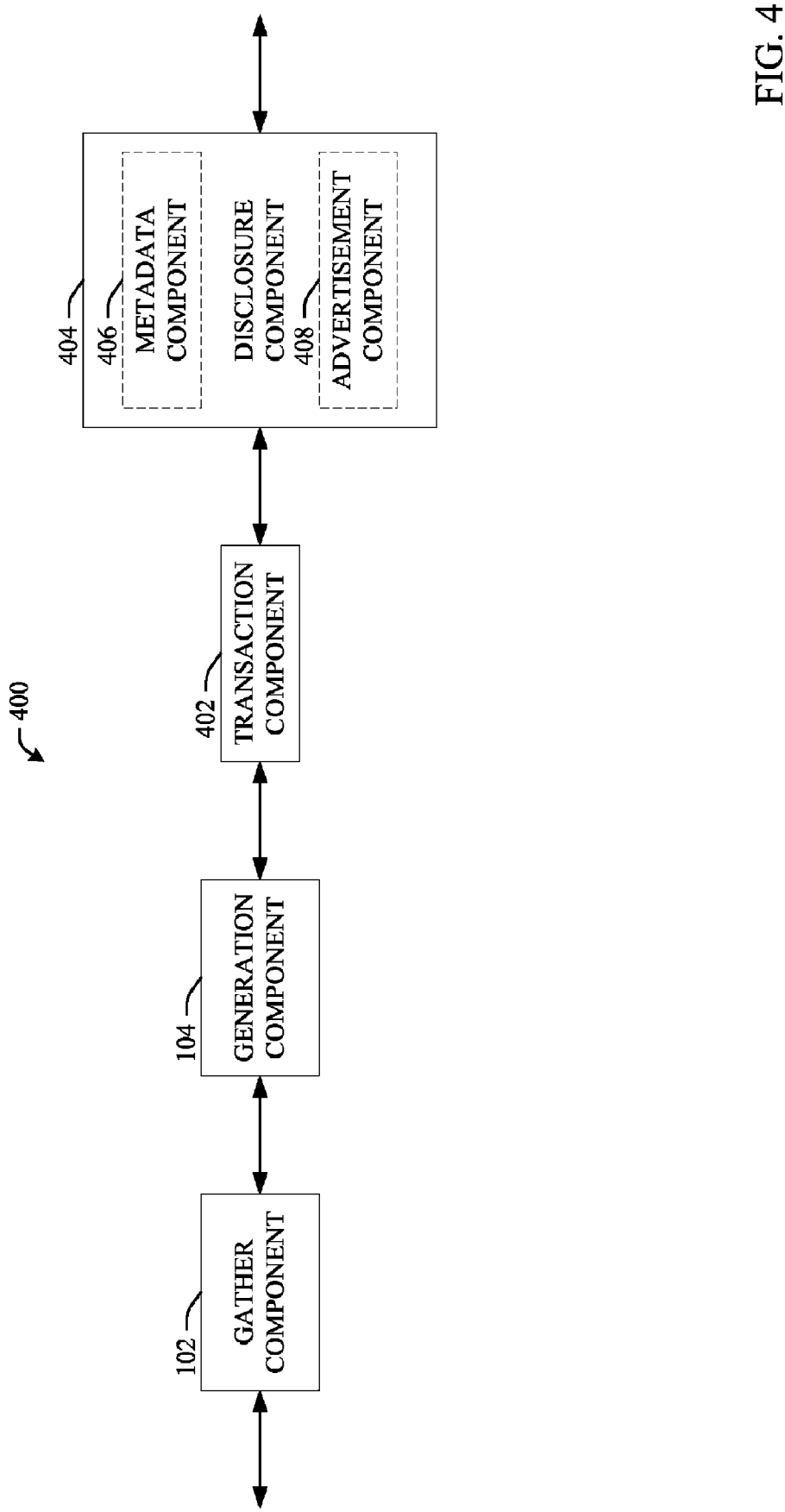
FIG. 4 illustrates a representative system for producing a pedestrian-based route with a transaction component and detailed disclosure component in accordance with an aspect of the subject specification.

Now referring to FIG. 4, an example system 400 is disclosed for producing a pedestrian route with a transaction component 402 and a disclosure component 404. A gather component 102 can obtain information related to pedestrian travel; a generation component 104 can produce a direction set for use by a pedestrian based at least part upon the obtained information. Production of the direction set can be based upon security information (e.g., avoiding unsafe neighborhoods), weather information (e.g., having a user travel indoors when rain is expected or taking place), terrain information (e.g., avoiding non-paved roads for an elderly pedestrian), or a combination thereof.

Various actions take place in accordance with direction set production, such as information passing between different parties. Rewards (e.g., money) can be exchanged between parties, accounts, etc. through used of a transaction component 402. The transaction component 402 can perform a reward (e.g., financial, non-financial, etc.) operation in relation to information obtainment or direction set production. The transaction component 402 can perform actions to meet constraints, such as debiting a user account and crediting a provider account. While fiscal amounts are commonly transacted, it is to be appreciated that other commodities can be exchanged, such as coupons, meeting of contractual obligations (e.g., canceling of a task to be performed), tax credits, etc.

Moreover, a reward operation can take place in relation to user response to a commercial detail (e.g., presented with a pedestrian route). For example, an advertisement can be played that a user should stop at a highway exit for a cup of coffee. If the user takes the exit, buys the cup of coffee, buys a different item, etc., then payments of varying amounts can be made to an advertisement hosting service.

A disclosure component 404 can provide the direction set to the pedestrian. A non-exhaustive list of disclosure components include a display screen, touch screen, speaker system, virtual reality environment, Braille production system, printer, etc. In addition, the disclosure component 404 can present information in multiple formats, such as showing a video with audio capabilities. In addition, a variety of components can operate in conjunction with the disclosure component as well as independently.

A metadata component 406 can modify information provided with the direction set based upon contextual information (e.g., a user appears to be in a hurry), pedestrian request (e.g., a user asking to not take a particular route, a fastest way, a shortest way, . . . ), pedestrian history (e.g., a user has shown a propensity to avoid particular areas), or a combination thereof. The contextual information, pedestrian request, pedestrian history, or a combination thereof can be obtained by the gather component 102. Moreover, the disclosure component 404 can provide the direction set with modified information to the pedestrian. The metadata component 406 can operate prior to a pedestrian being presented a direction set as well as modify an already presented direction set. In an illustrative example, a user can have a history of becoming confused and lost in subway systems. The metadata component 406 can add information to a route when a user enters a subway system (e.g., normally sign names are given with a direction set; however, in subways sign names and colors are given.)

In addition to information concerning a route being presented to a pedestrian, an advertisement component 408 can integrate a commercial detail with a direction set. A non-exhaustive list of commercial details can include advertisements of a product or service, coupon, movie preview, etc. For example, a notice can be included in a direction set that a pedestrian can take slight detour and stop at a favorite place to receive coffee. The user can be compensated (e.g., financially) for being presented a commercial detail and a direction set can be altered to take a user to a location related to a commercial detail.

Figure 5:
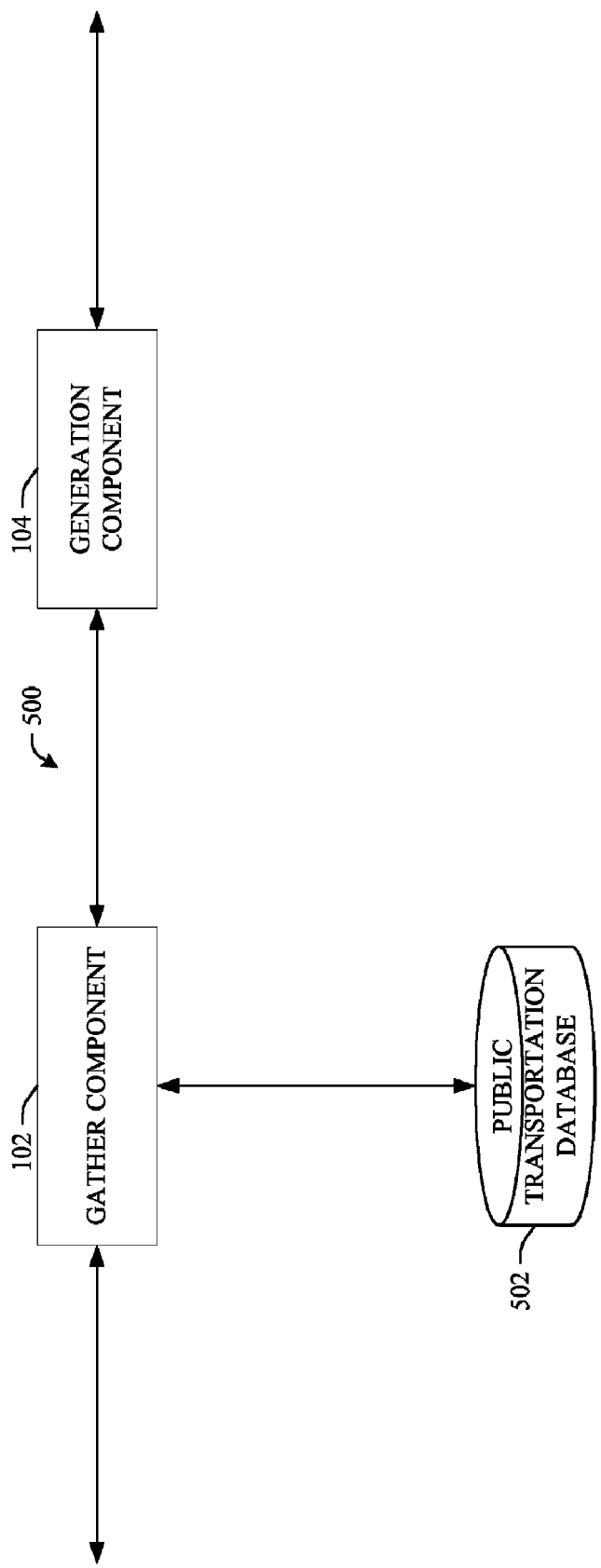
FIG. 5 illustrates a representative system for producing a pedestrian-based route in conjunction with use of a public transportation system in accordance with an aspect of the subject specification.

Now referring to FIG. 5, an example system 500 is shown that produces a pedestrian-based route that enables a pedestrian to take advantage of public transportation and integrated usage of public transportation in a direction set. A gather component 102 can obtain information related to pedestrian travel; thus, the gather component 102 can operate as a means for collecting information related to travel.

A generation component 104 can produce a direction set for use by a pedestrian based at least part upon the obtained information. The generation component 104 can implement as a means for outputting a direction set based upon at least part of the obtained information, the direction set includes a portion where a user travels in a natural manner (e.g., such as walking, swimming, climbing, using a manner appropriate for a disability, such as riding in a wheelchair that is hand powered or electronic, etc.) and a portion where the user functions as a passenger (e.g., traveler in a vehicle, operator of a vehicle/bicycle, etc.). The system 500 can configure such that at least part of the portion where the user functions as a passenger employs the user being a passenger upon public transportation (e.g., public system, private commercial system for movement of at least one person, etc.). For example, a route can have portions where a user walks, drives a motorcycle, and is a passenger in a taxi. The route does not have to specify a vehicle to be used, such as a route taking a user to a bus stop, where the user can become a passenger on a bus or obtain a taxi ride.

A public transportation database 502 can be used to provide information concerning public transportation. Example information includes routes, schedules, estimated vehicle population density, vehicle metadata (e.g., is a particular bus running on time), etc. A non-exhaustive list of public transportation implementations can include airlines, buses, trains, taxi services, rickshaws, ferries, escalators, elevators, automotive pools, shared rides, multiple-person bicycles, and the like. In one example, a route can be produced by the generation component 104 that has a user walk from her home to her car, drive to an airport parking deck, walk from the parking deck to an airplane, ride the airplane, walk to meet a taxi, take the taxi to a hotel, and walk to a hotel counter.

Figure 6:
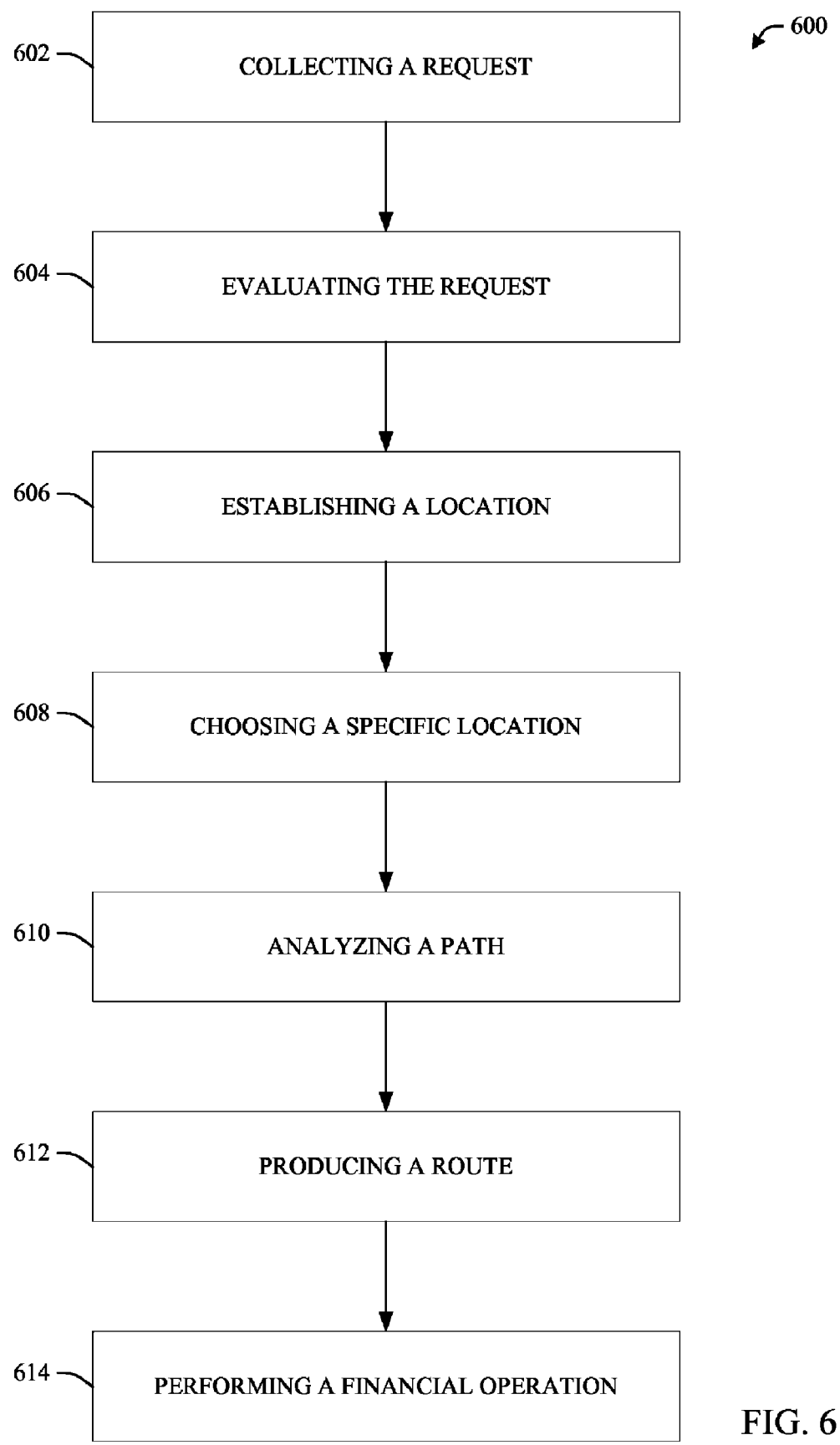
FIG. 6 illustrates a representative methodology for performing actions related to output of a pedestrian-based route in accordance with an aspect of the subject specification.

Now referring to FIG. 6, an example methodology 600 is disclosed for performing actions towards a pedestrian-based route. At action 602, a request is collected that a route takes a user to a location, such as a coffee shop (e.g., any coffee shop, a type of coffee shop, a specific shop, etc.). A coffee shop example is used throughout the methodology 600 to highlight various aspects. For instance, a user can send a text message to a friend that he would like to go to a coffee shop and the methodology 600 can extract a request from the text message; however, a request can be a direct appeal from a user.

At event 604, a request produced by a user can be evaluated. The methodology 600 can read the text message and infer that a route should be altered taking a user to a coffee shop. Additional information can be ascertained relating to a request—for instance a pedestrian can request that a coffee shop be integrated into a route immediately (e.g., make a stop as soon as possible) or integration to take place at anytime along a route.

A search can be performed of relevant localities within an area (e.g., city limits) at act 606. The search can be specific or general—for any coffee shop, for a coffee shop within a certain distance, for a specific coffee shop chain, etc. A search can be localized (e.g., searching a database for locations) as well as broad (e.g., attempting to communicate with nearby coffee shops) and other implementations.

Based upon locations established at action 606, a specific location can be chosen at act 608 (e.g., selecting one coffee shop to integrate upon a route from several located coffee shops). Various criteria can be used to select a specific location ranging from user criteria as well as contextual reasons. For instance, different coffee shops can offer different coupons for a user to stop at a shop. User history can be evaluated to infer a coupon that would be most beneficial to a user (e.g., a coupon on a user's favorite coffee drink) and evaluation results can be used to select a location.

At act 610, a database of paths can be analyzed in order to determine how a pedestrian can reach a specific location as well as reach an intended destination from the specific location. In order for a pedestrian to reach a selected location, paths are taken to connect a user location to a route. A path database can be analyzed to determine pedestrian friendly paths that can be taken. In addition to available paths, metadata can be gained, such as safety of paths, expected traffic, path views (e.g., if a user is a tourist, then she can desire to travel along routes that are considered more scenic or more historical), and the like.

A pedestrian based route can be produced that can include travel to a specific location at action 612. Commonly, the produced route is outputted to a user through a disclosure device. According to one embodiment, a considerable portion of the route takes the pedestrian along at least one path that is not maneuverable by an automobile. Moreover, the produced route can be based upon security information, weather information, terrain information, or a combination thereof. It is to be appreciated that action 602 can configure to follow directly into action 612 without act 606, 608, or 610.

At block 614, a financial transaction can take place in accordance with the methodology 600. Money can be exchanged between parties due to functions of the methodology 600. For instance, if a particular coffee shop is selected, then the coffee shop can be obliged to pay a company running the methodology 600 for the selection. Money can be debited from an account of the coffee shop and credited to a user account. While money is discussed, it is to be appreciated non-monetary rewards can change between parties.

Figure 7:
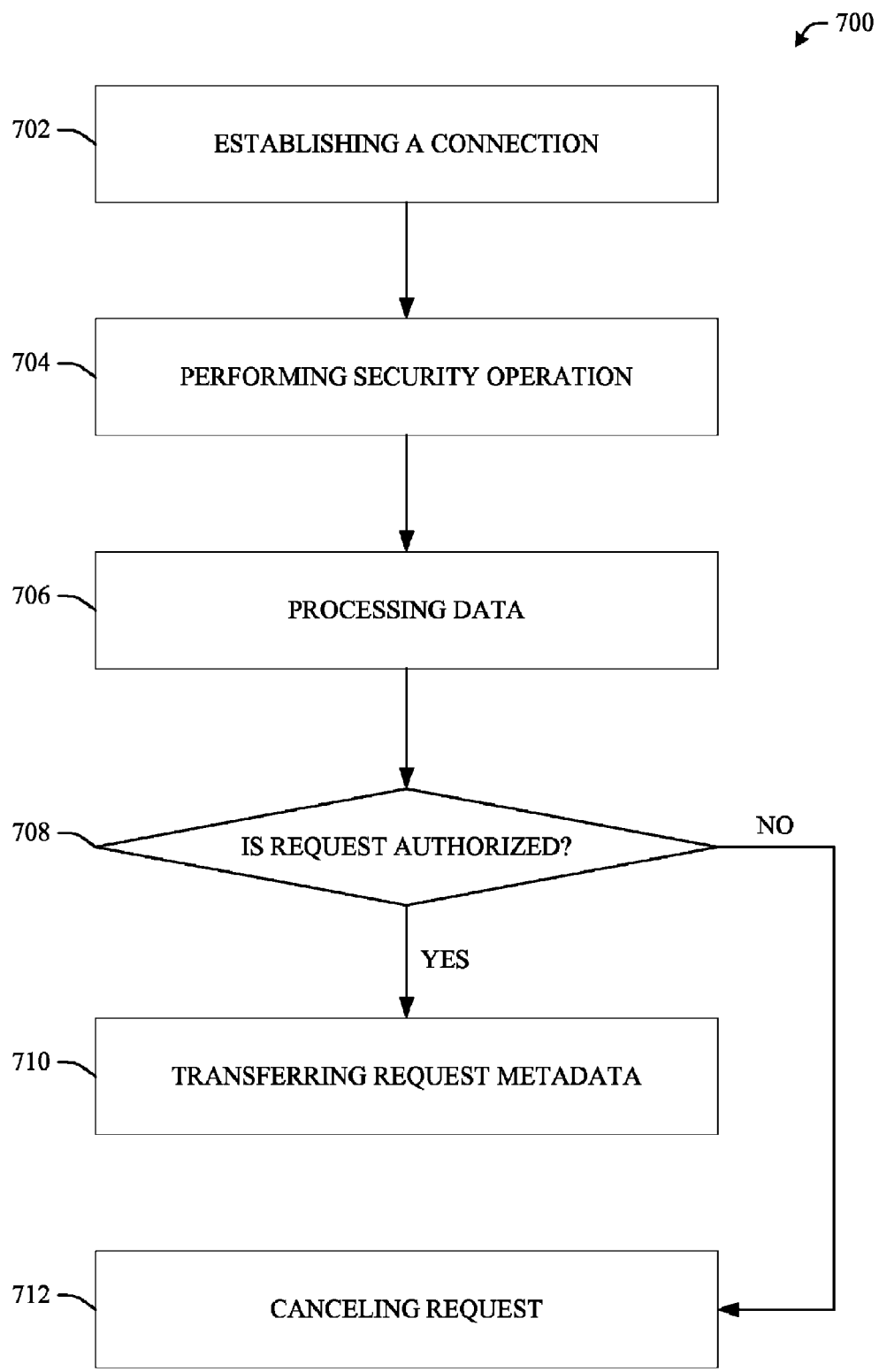
FIG. 7 illustrates a representative methodology for collecting a request from a user to produce a route with a waypoint in accordance with an aspect of the subject specification.

Now referring to FIG. 7, an example methodology 700 is disclosed for collecting a request from a pedestrian that a route includes a waypoint (e.g., a non-final stop, a destination, etc.) to a general location such as action 602 of FIG. 6. Commonly, a generation location is a type of location, such as a coffee shop; however, it can be a coffee shop of a certain company, a particular shop (e.g., the coffee shop on 'Main Street'), etc. A connection can be established (e.g., electronic coupling) between a user input interface and a processor that allows for a request to be communicated at event 702.

A request can include harmful characteristics, such as viruses, and operations to prevent damage can take place at action 704. A scan can take place upon an incoming request and safety measures can be implemented, such a quarantining dangerous data. If dangerous data is discovered, then a message can be sent that a supplemental request should be made. Security operation can include authentication for authorizing access to restricted areas.

At block 706, data can be processed related to the request to ascertain characteristics of the request. Processing request data, such as learning a time a request was made, enables specific actions to take place based upon the request. Information learned from the processing can be retained in storage.

A check 708 takes place to determine if a request is authorized. For instance, a pedestrian can travel upon a military base where access at many areas is restricted. If a pedestrian requests that a waypoint be included that takes the pedestrian to a munitions depot, then the check 708 can determine if the pedestrian is allowed to receive information concerning a depot.

If a request is authorized, then request metadata can be transferred at act 710. Commonly, the information is transferred to a location that can perform production of a pedestrian-based route. An unauthorized request can lead to request cancellation at event 712 and a message can be sent to a requesting party stating that a request was denied. In an alternative embodiment, while a request is authorized, it can be possible that a request cannot be complied (e.g., a location requested does not exist). A message can be transferred to a user stating that a request cannot be followed as well as why it is not being followed.

Figure 8:
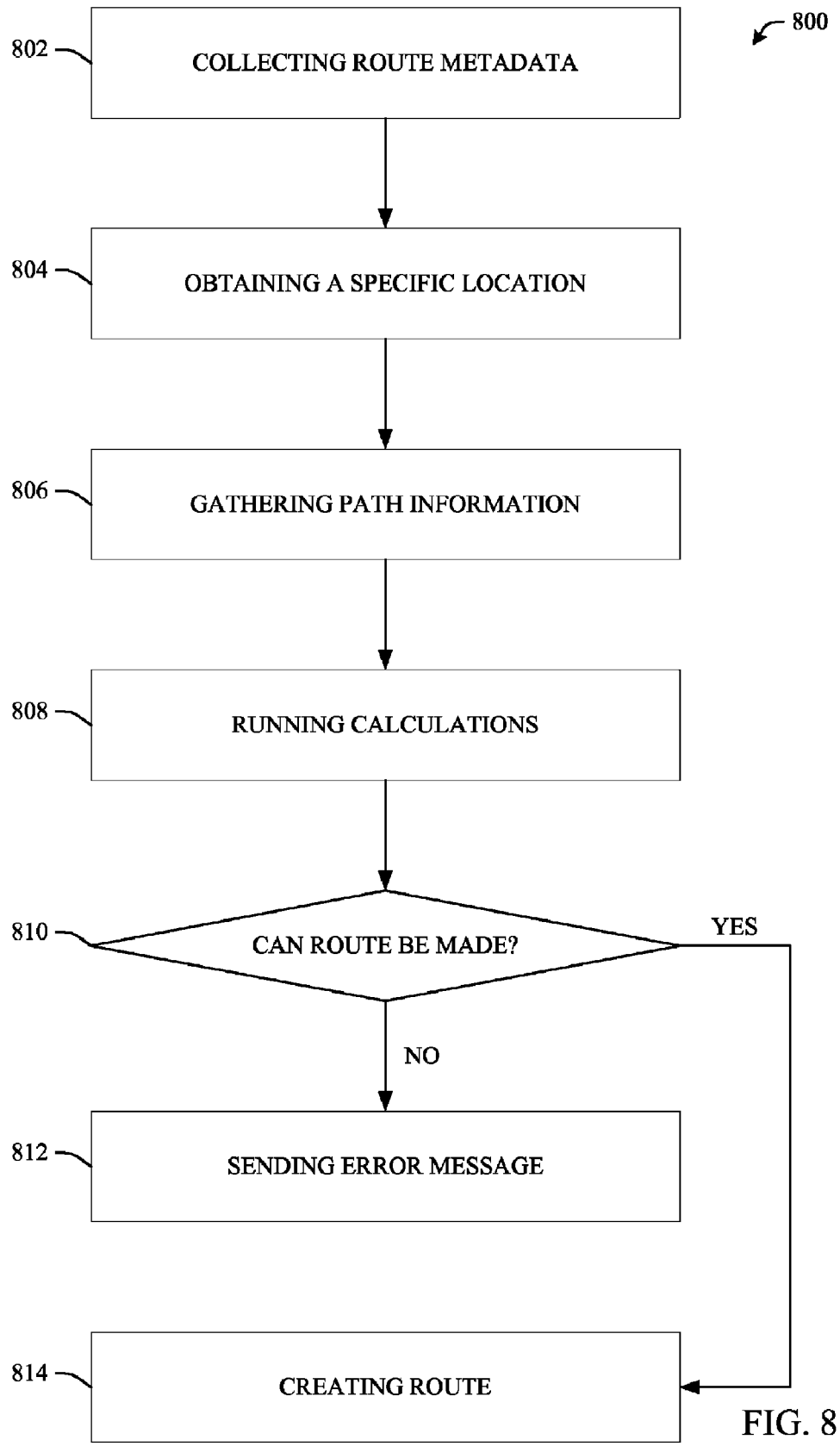
FIG. 8 illustrates a representative methodology for pedestrian route production in accordance with an aspect of the subject specification.

Now referring to FIG. 8, an example methodology 800 is disclosed for producing a pedestrian-based route that includes a waypoint to a specific location, based upon the collected request, such as action 612 of FIG. 6. According to one embodiment, route metadata can be collected at event 802 when a route exists and is to be modified. However, it is to be appreciated that a route can be created without used of a previous route. Specific location data, such as a coffee shop to be visited, can be obtained at event 804, which can originate from action 606 of FIG. 6. Moreover, at action 806, path information is gathered, commonly originating from a map.

A variety of calculations can take place in accordance with the methodology 800 at event 808. For instance, multiple locations can be chosen and event 808 selects a best location base upon user interest, convenience, etc. In addition, calculations can be performed that discover a path that can take a user to a specific location (e.g., at least on path from a current location to a specific location). Multiple routes can be established and weighted against one another to determine a route that should be presented to a user.

A check 810 can take place to determine if a route can be made that includes the specific location. For example, a user can request to go to restaurant chain that is out of business, therefore a route cannot be created. The check 810 can determine if a route can be made in general as well as if a route can be realistically made. For instance, if a nearest requested location is several hundred miles away, then it can be considered unrealistic for a pedestrian to travel such a long distance.

If no route can be made (e.g., reasonably be made), then an error message can be sent at block 812. The error message can be interactive, such as asking a user if she would like to make another request. At event 814, if a route can be made, then an appropriate route is created. Creation of a route can include building a new route as well as modifying an existing route.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
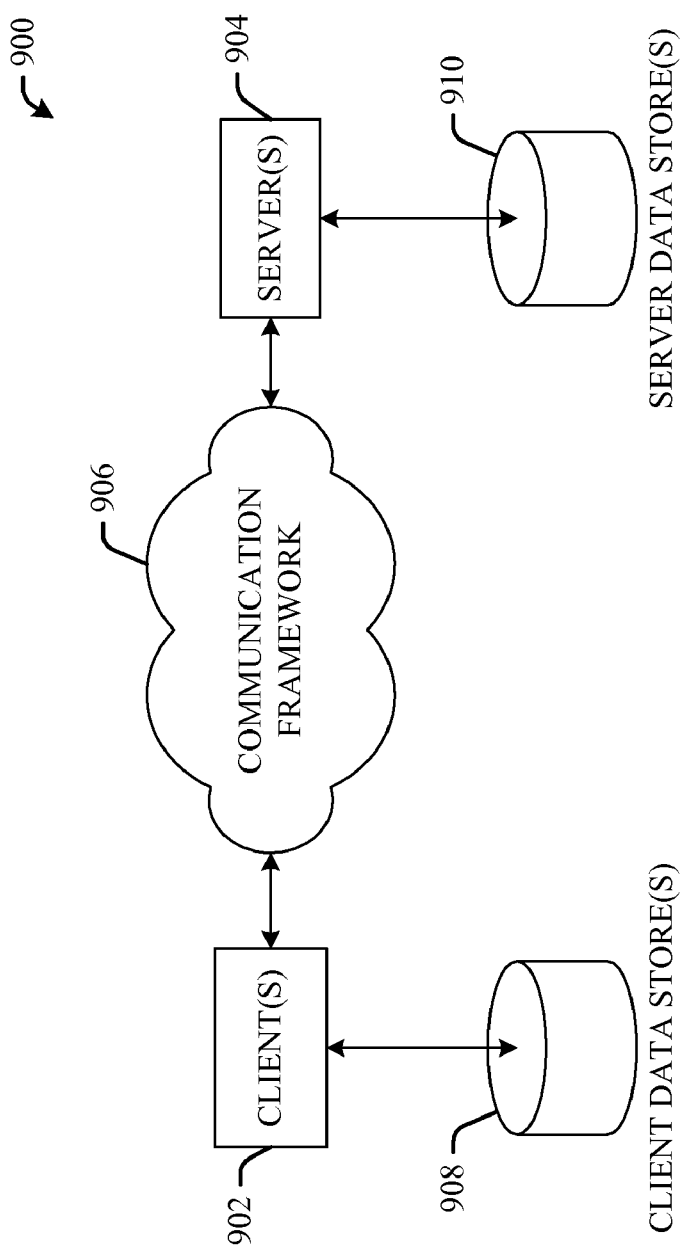
FIG. 9 illustrates an example of a schematic block diagram of a computing environment in accordance with the subject specification.
Figure 10:
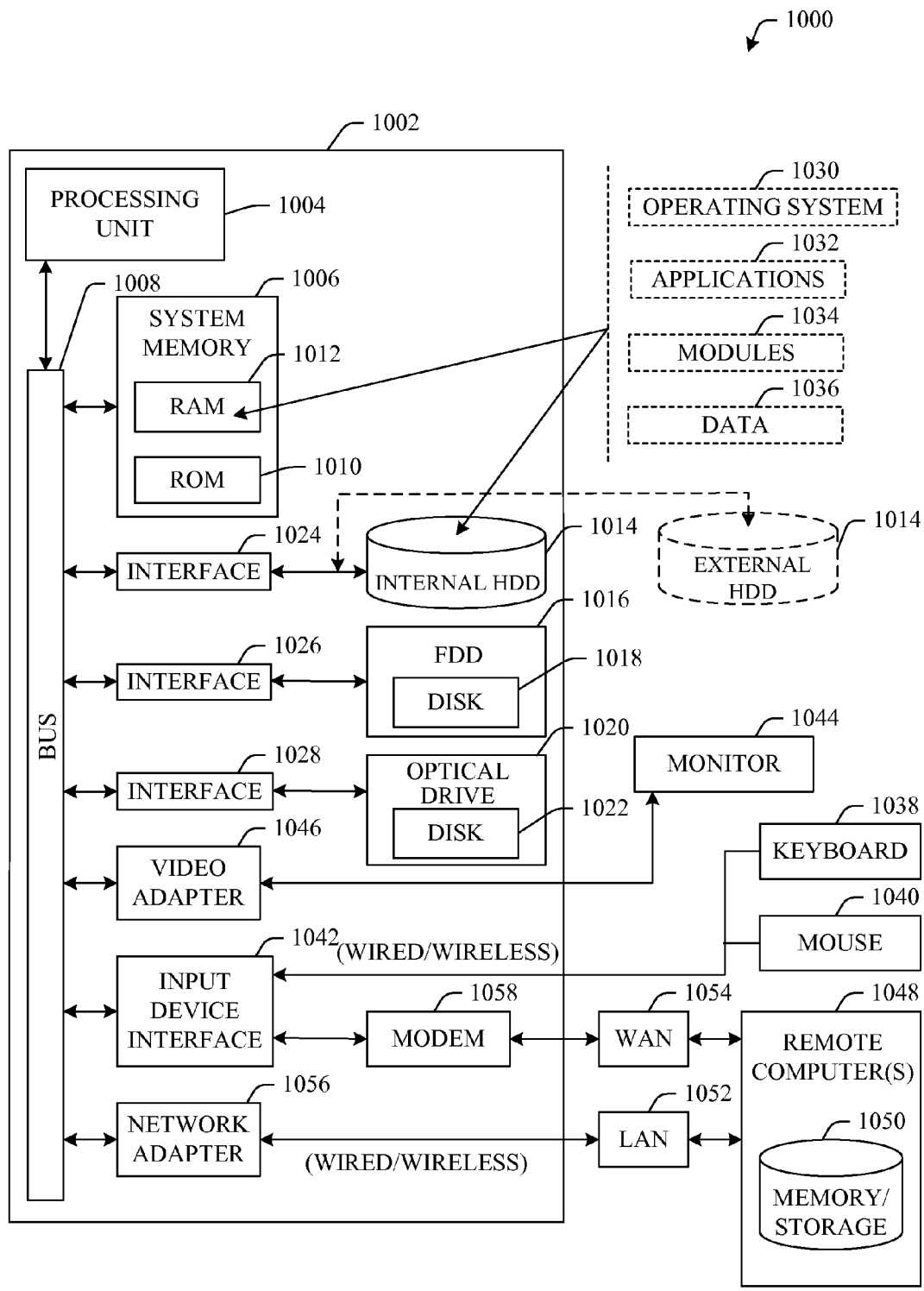
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. Computer storage media having embodied thereon computer-useable instructions that, when executed, implement a system, the system comprising:
   a search component that locates at least one information source, retains pedestrian history from a plurality of pedestrians and addresses of at least one information source that has a history of providing reliable information, identifies low quality information sources that do not provide information used in route generation, and blocks information obtainment for the low quality information sources;
   a gather component that obtains information related to pedestrian travel including security information, weather information, and terrain information, wherein the gather component obtains the information from the at least one located information source;
   an artificial intelligence component that makes at least one inference regarding a route based on a previous pedestrian behavior;
   a filter component that determines, based on the at least one inference, the information that is likely relevant and deletes information that is commonly of little value in part through examination of previously produced routes;
   an analysis component that determines an importance of the information to a user, estimates how likely the information is to change, and chooses if the user should reach a destination through a pedestrian route and/or through a conventional route;
   a generation component that obtains the information from the gather component and produces a direction set for use by a pedestrian based at least part upon the obtained information; and
   a resolution component that resolves a conflict between an information source with a financial interest and an information source without a financial interest and instructs the generation component to produce the direction set based upon the information source that does not have a financial interest in providing the direction set.

2. The system of claim 1, wherein a substantial portion of the direction set takes a user along a route that is not maneuverable by an automobile.

3. The system of claim 1, further comprising a disclosure component that provides the direction set to the pedestrian.

4. The system of claim 3, further comprising a metadata component that modifies information provided with the direction set based upon contextual information, pedestrian request, pedestrian history, or a combination thereof, the contextual information, pedestrian request, pedestrian history, or a combination thereof is obtained by the gather component, the disclosure component provides the direction set with modified information to the pedestrian.

5. The system of claim 1, further comprising a transaction component that performs a reward operation in relation to information obtainment or direction set production, wherein the reward operation rewards the pedestrian, an advertisement hosting service, a provider, or any combination thereof.

6. The system of claim 1, further comprising an advertisement component that integrates a commercial detail with a direction set.

7. Computer storage media having embodied thereon computer-useable instructions that, when executed, perform a method, the method comprising:
   collecting a request from a pedestrian that a route includes a waypoint to a general location;
   locating at least one information source, retaining pedestrian history from a plurality of pedestrians and addresses of at least one information source that has a history of providing reliable information, identifying low quality information sources that do not provide information used in route generation, and blocking information obtainment for the low quality information sources;
   obtaining information related to pedestrian travel including security information, weather information, and terrain information, wherein the gather component obtains the information from the at least one located information source;

making at least one inference regarding a route based on a previous pedestrian behavior;

determining, based on the at least one inference, the information that is likely relevant and deleting information that is commonly of little value in part through examination of previously produced routes;

determining an importance of the information to a user, estimating how likely the information is to change, and choosing if the user should reach the destination through pedestrian route and/or through a conventional route;

resolving conflicts between an information source with a financial interest and an information source without a financial interest and producing a direction set based upon the information source that does not have a financial interest in providing the direction set;

collecting information concerning routes of other people; and using the collected information to update the pedestrian-based route in real time.

8. The method of claim 7, wherein a considerable portion of the route takes the pedestrian along at least one path that is not maneuverable by an automobile.

9. The method of claim 7, further comprising evaluating the request from a pedestrian that a route include a waypoint to a general location.

10. The method of claim 7, further comprising establishing at least one specific location.

11. The method of claim 10, further comprising choosing at least one specific location for inclusion in the pedestrian based route from at least one established specific location.

12. The method of claim 7, further comprising analyzing at least one available path, at least one analyzed path is at least part of the pedestrian-based route and takes the user to the specific location.

13. The system of claim 1, further comprising an interaction component for collecting information concerning routes of other people and using the route information to update the direction set in real-time.

14. The system of claim 1, wherein the direction set includes a portion where a user travels in a natural manner and a portion where the user travels as a passenger.

15. The system of claim 14, wherein at least part of the portion where the user travels as a passenger employs the user being a passenger upon public transportation.

* * * * *